(12) United States Patent
Konsella et al.

(10) Patent No.: US 8,639,760 B2
(45) Date of Patent: Jan. 28, 2014

(54) HARD IMAGING DEVICES, HARD IMAGING SYSTEMS, ARTICLES OF MANUFACTURE, HARD IMAGING DEVICE ELECTRONIC MAIL PROCESSING METHODS

(75) Inventors: Shane Konsella, Star, ID (US); Curtis Reese, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2816 days.

(21) Appl. No.: 10/458,891

(22) Filed: Jun. 10, 2003

(65) Prior Publication Data

US 2004/0254987 A1    Dec. 16, 2004

(51) Int. Cl.
*G06F 15/16*    (2006.01)

(52) U.S. Cl.
USPC .......................... 709/206; 709/219

(58) Field of Classification Search
USPC .......................... 709/206, 219, 250
See application file for complete search history.

(56) References Cited

U.S. PATENT DOCUMENTS

| | | |
|---|---|---|
| 4,558,302 A | 12/1985 | Welch |
| 4,943,936 A | 7/1990 | Hirai et al. |
| 5,129,049 A | 7/1992 | Cuzzo et al. |
| 5,483,653 A | 1/1996 | Furman |
| 5,689,642 A | 11/1997 | Harkins et al. |
| 5,860,073 A | 1/1999 | Ferrel et al. |
| 5,870,089 A | 2/1999 | Fabbio et al. |
| 5,870,464 A | 2/1999 | Brewster et al. |
| 5,915,079 A | 6/1999 | Vondran, Jr. et al. |
| 5,923,013 A | 7/1999 | Suzuki et al. |
| 5,940,585 A | 8/1999 | Vondran, Jr. et al. |
| 5,956,487 A | 9/1999 | Venkatraman et al. |
| 5,995,723 A | 11/1999 | Sperry et al. |
| 5,999,945 A | 12/1999 | Lahey et al. |
| 6,049,390 A | 4/2000 | Notredame et al. |
| 6,052,198 A | 4/2000 | Neuhard et al. |
| 6,204,935 B1 | 3/2001 | Soma et al. |
| 6,256,666 B1 | 7/2001 | Singhal |
| 6,330,071 B1 | 12/2001 | Vidyanand |

(Continued)

FOREIGN PATENT DOCUMENTS

| | | |
|---|---|---|
| EP | 1056247 A2 | 5/2000 |
| JP | 10124598 | 5/1998 |
| WO | WO99/24933 | 5/1999 |

OTHER PUBLICATIONS

"HP ChaiServer Guide" "Release 3.1" "General Overview of HP ChaiServer"; http://user.devnet.external.hp.com/site/chai/csguide/Overview.html; Jul. 23, 2002; pp. 1-3.

(Continued)

*Primary Examiner* — John B. Walsh

(57) ABSTRACT

Aspects of the invention relate to hard imaging devices, hard imaging systems, articles of manufacture, hard imaging device electronic mail processing methods. A hard imaging device includes a communications interface configured to communicate with a communications medium and a communications device, the communications device and the communications medium are communicatively coupled with one another and located external of the hard imaging device, an image engine configured to form hard images using media, processing circuitry configured to control the image engine to form hard images and to communicate with the communication device and an external computer device, and wherein the processing circuitry is configured to track electronic mail communication comprising electronic information received within the hard imaging device and invoke an operation of the hard imaging device.

28 Claims, 3 Drawing Sheets

(56) References Cited

U.S. PATENT DOCUMENTS

| | | |
|---|---|---|
| 6,542,892 B1 | 4/2003 | Cantwell |
| 6,750,982 B1 | 6/2004 | Takaira et al. |
| 6,801,935 B2 * | 10/2004 | Shen .............................. 709/219 |
| 6,919,967 B1 * | 7/2005 | Pentecost et al. ............ 358/1.15 |
| 6,980,319 B2 | 12/2005 | Ohta |
| 6,993,562 B2 * | 1/2006 | Treptow et al. ............... 709/206 |
| 7,016,057 B1 | 3/2006 | Maruyama |
| 7,072,059 B2 | 7/2006 | Van Der Linden et al. |
| 7,120,634 B2 | 10/2006 | Jecha et al. |
| 7,321,437 B2 * | 1/2008 | Parry ........................... 358/1.15 |
| 2002/0062406 A1 * | 5/2002 | Chang et al. ....................... 710/1 |
| 2004/0196492 A1 * | 10/2004 | Johnson et al. .............. 358/1.15 |
| 2004/0218213 A1 | 11/2004 | Shimizu et al. |

OTHER PUBLICATIONS

"HP ChaiServer Guide" "Release 3.1." "General Overview of HP ChaiServer" "ChaiServices"; http://user.devnet.external.hp.com/site/chai/csguide/Overview.html; Jul. 23, 2002; pp. 6-7.

"HP Embedded Web Server for HP LaserJet Printers" "User Guide"; Hewlett-Packard Company; 2001; 62 pps.

* cited by examiner

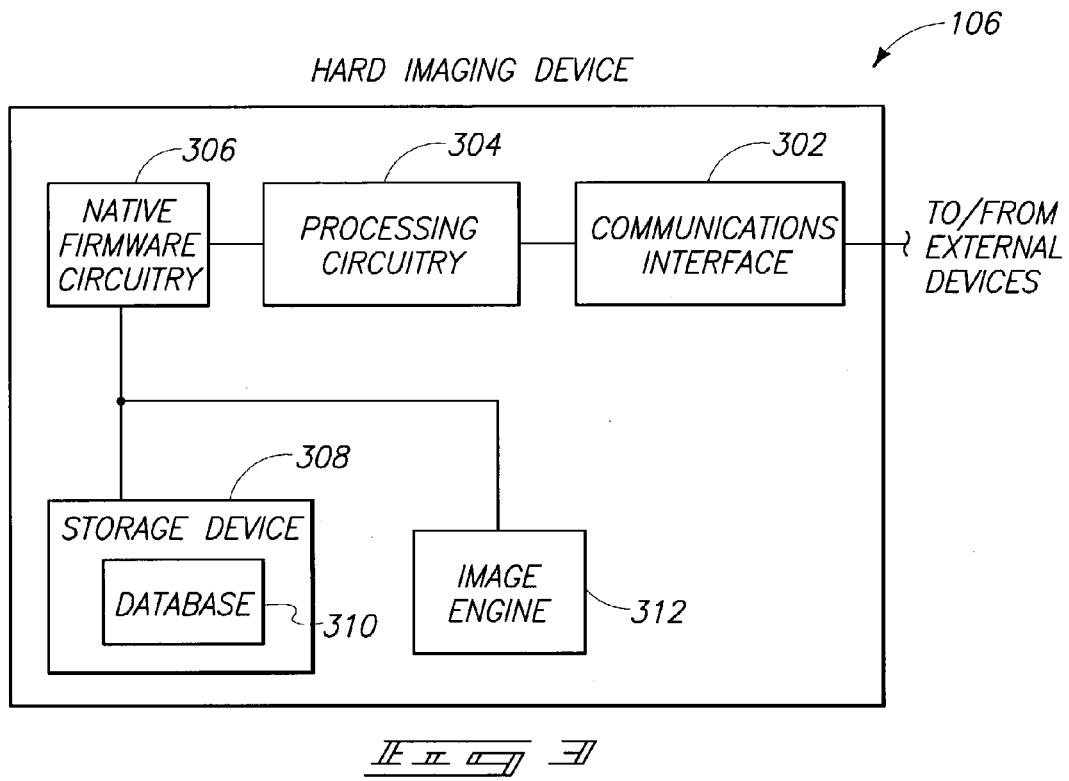
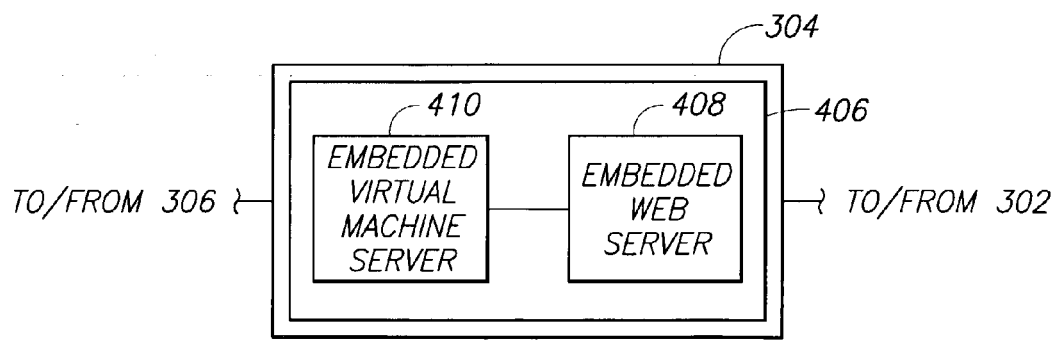

HARD IMAGING DEVICES, HARD IMAGING SYSTEMS, ARTICLES OF MANUFACTURE, HARD IMAGING DEVICE ELECTRONIC MAIL PROCESSING METHODS

FIELD OF THE INVENTION

Aspects of the invention relate to hard imaging devices, hard imaging systems, articles of manufacture, and hard imaging device electronic mail processing methods.

BACKGROUND OF THE INVENTION

Computer systems including personal computers, workstations, hand held devices, etc. have been utilized in an increasing number of applications at home, the workplace, educational environments, entertainment environments, etc. Peripheral devices of increased capabilities and performance have been developed and continually improved upon to extend the functionality and applications of computer systems. For example, imaging devices, such as printers, have experienced significant advancements including refined imaging, faster processing, and color reproduction.

Some imaging device configurations have become more sophisticated as the capabilities and performance increase. These devices may utilize programming, such as firmware, to implement various imaging operations including determining imaging device status and navigating imaging file systems using Embedded Web Server (EWS) and Embedded Virtual Machine (EVM) technologies. The EWS and EVM technologies also provide support for electronic mail (e-mail) capabilities to invoke operations of a hard imaging device, such as a printer. In one exemplary approach, (e-mail includes an invocation capability for embedded web services, which are Java-based applications, which execute on the EWS/EVM technology. These applications may extend or update functionality of the hard imaging device.

Aspects described herein provide improved hard imaging devices, hard imaging systems, hard imaging device file system accessing methods, and hard imaging device email processing methods.

DESCRIPTION OF THE DRAWINGS

FIG. 3 is a functional block diagram of a hard imaging device according to one embodiment.

FIG. 4 is a functional block diagram of processing circuitry of a hard imaging device according to one embodiment.

DETAILED DESCRIPTION OF THE INVENTION

Figure 1:
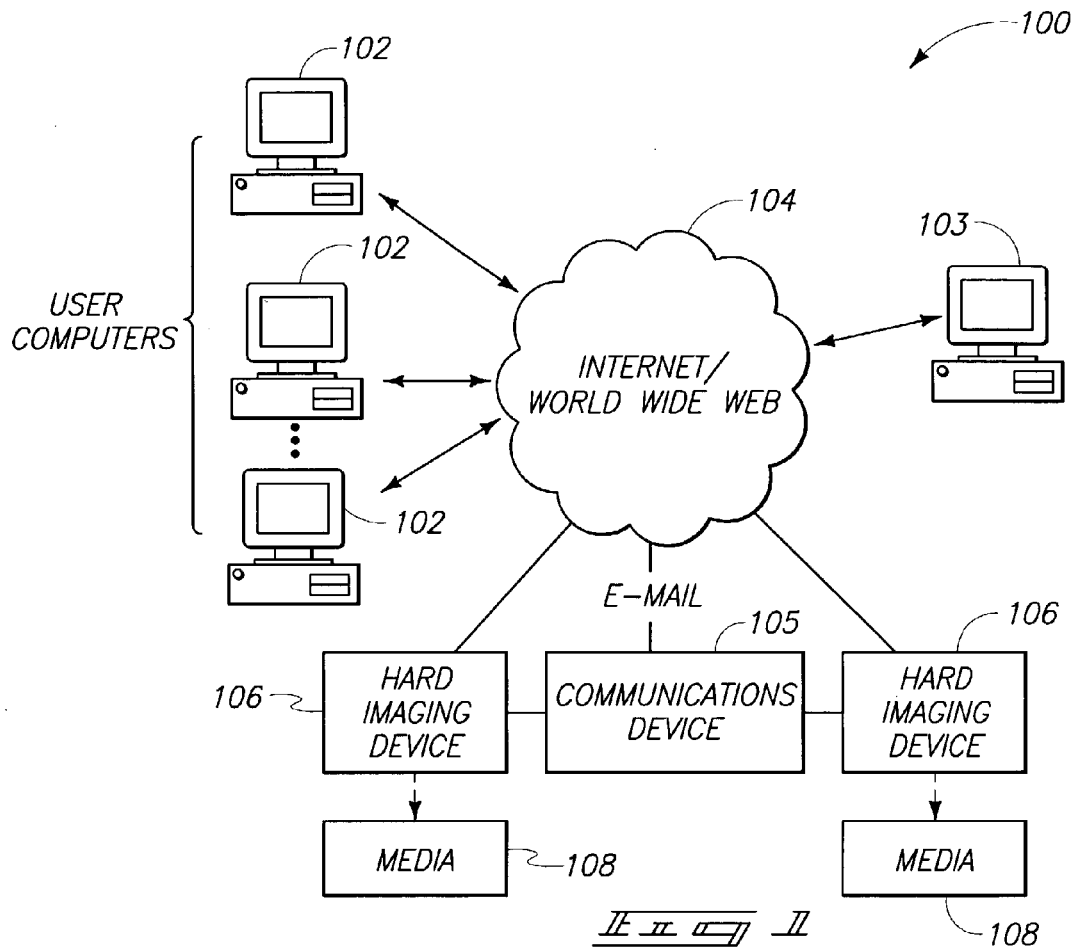
FIG. 1 is a functional block diagram of a hard imaging system according to one embodiment.

In one aspect, the present invention provides a hard imaging device comprising a communications interface configured to communicate with a communications medium and a communications device, the communications device and the communications medium are communicatively coupled with one another and located external of the hard imaging device, an image engine configured to form hard images using media, processing circuitry configured to control the image engine to form hard images and to communicate with the communication device and an external computer device, and wherein the processing circuitry is configured to track electronic mail communication comprising electronic information received within the hard imaging device and invoke an operation of the hard imaging device.

In another aspect, the present invention provides a hard imaging device comprising a communications interface configured to communicate with a communications medium and a communications device, the communications device and the communications medium are communicatively coupled with one another and located external of the hard imaging device, an image engine configured to form hard images using media, processing circuitry configured to control the image engine to form a hard image and to communicate with the communications device and a remote computer, and wherein the processing circuitry is configured to process electronic information sent with an electronic mail message from the remote computer, and notify select registered users of the hard imaging device of the processing.

In a further aspect, the present invention provides a hard imaging system comprising one or more external computers communicatively coupled to a communications medium, a communications device communicatively coupled to the communications medium, a plurality of hard imaging devices individually comprising a communications interface configured to communicate with the communications medium and the communications device, an image engine configured to form hard images using media, processing circuitry configured to control communications with the communications device and the one or more external computers, wherein the processing circuitry is configured to track an electronic mail request from a user of the one or more external computers attempting to invoke processing of an electronic file attachment sent with the mail request, and the one or more external computers individually comprising a communications interface configured to communicate with the communications medium, the hard imaging devices, and the communications device, and processing circuitry configured to control communications with the communications device, and to access and display information regarding the tracked electronic mail request of the respective hard imaging devices.

In an additional aspect, the present invention provides a hard imaging device comprising a communications means for communicating with a communications medium and a communications device, the communications device and the communications medium are communicatively coupled with one another and located external of the hard imaging device, and processing means configured to communicate with the communications device and a remote computer, the processing means further configured to track an electronic mail request from a user of the remote computer invoking processing of an electronic file attachment sent with the electronic mail request, the processing means further configured to notify a registered user of the hard imaging device responsive to the invoking.

In yet another aspect, the present invention provides a hard imaging device electronic mail processing method comprising providing a hard imaging device configured to form hard copy images using media, providing a communications device configured to communicate electronic mail messages and electronic information sent with the mail messages from a remote user to the hard imaging device for processing by the hard imaging device, receiving the mail messages and the electronic information for processing by the hard imaging device, and tracking an electronic mail message from the remote user requesting invocation of processing electronic information by the hard imaging device.

In a further aspect, the present invention provides a hard imaging device electronic mail processing method comprising receiving in the hard imaging device an electronic communication with a file attachment from a remote user, tracking the electronic communication requesting invocation of processing of the file attachment by the hard imaging device, and notifying a registered user of the tracking.

In yet another aspect, the present invention provides an article of manufacture comprising processor-usable media comprising programming configured to cause a processing circuitry of a hard imaging device to receive an electronic message with a file attachment from a remote user to invoke processing of the attachment by the hard imaging device, classify the electronic message responsive to the receiving to perform the invocation, store the electronic mail message in a storage device of the hard imaging device, and notify information of the electronic message to a user of the hard imaging device.

Referring to FIG. 1, an exemplary hard imaging system 100 arranged according to one embodiment is shown. The depicted hard imaging system 100 includes one or more user computers 102-103, a communications medium 104, a communications device 105 (e.g., an e-mail exchange server), and one or more hard imaging devices 106. In one arrangement, a user of a computer 102 may be configured as an administrator of the hard imaging device 106. Exemplary administrative capabilities include addition or deletion of users registered to use a respective hard imaging device 106, modifying access privileges of a user, and administering accounts (e.g., addition, deletion, etc.) of respective hard imaging devices 106 with the communications device 105 and configuring respective hard imaging devices 106 of such accounts. In one arrangement, at least some or all of devices 102, 103, 105, and 106 are provided at locations physically separated from one another.

Individual ones of user computers 102 may be configured to invoke an operation of respective hard imaging devices 106. Exemplary invoking operations include installation of executable instructions or executable applications sent as an attachment to an electronic mail message (e.g., e-mail message), or printing a file sent as an attachment of an e-mail message as described further below. Accordingly, file attachments are used in one embodiment. Other forms of electronic communication may be used by a user of computers 102-103 to invoke an operation of the hard imaging device 106. In one embodiment, one or more users may be configured as registered users of a respective hard imaging device 106, and the one or more computers 102-103 may be configured to access a respective hard imaging device 106 or the communications device 105. For simplicity sake, henceforth, reference would be made to one hard imaging device 106. It will, however, be appreciated that more than one hard imaging device may be communicatively coupled to the communications medium 104 to communicate with the communications device 105 and one or more users at one or more computers 102-103 as illustrated in FIG. 1. Also, for simplicity in explaining exemplary concepts, a user of computer 103 would be referred to as an unregistered user of the hard imaging device 106, and the users of computers 102 would be referred to registered users of the hard imaging device 106. Some arrangements of the system 100 may include more than one administrative user at computers 102. These examples of the administrators, registered users, and unregistered users of the hard imaging device 106 are for purposes of illustration only. Other combinations of the administrators, registered users, and unregistered users to use and invoke an operation of the hard imaging device 106, are possible. The hardware configuration of computer 103, however, may be similar to the hardware configuration of computers 102, further configuration details of which are described at FIG. 2.

Communications medium 104 is configured to implement bi-directional communications between computers 102, computer 103, communications device 105, and the hard imaging device 106. Communications medium 104 may be configured in any suitable manner to provide communication of electronic data, programming or other information between communicatively coupled devices. For example, communications medium 104 may comprise private and/or public networked components, (e.g., internet, intranet, World Wide Web, communications network using an HTTP protocol format, etc.).

Communications device 105 is configured to communicate information between the computers 102, computer 103, and the hard imaging device 106. In one embodiment, the communications device 105 may be an e-mail exchange server having a storage device, a processing circuitry, and a communications interface (not shown) for enabling information communications between a plurality of devices (e.g., computers 102, computer 103, and hard imaging device 106). The communications device 105 may be configured in an exemplary e-mail embodiment to register an electronic address of the hard imaging device 106 for communicating information between the computers 102 or computer 103 and the hard imaging device 106. As noted above, an administrator user at computers 102 may administer (e.g., add, delete or modify) an account of the hard imaging device 106 registered with the communications device 105. For example, an administrator may create an account for hard imaging device 106 with the communications device 105 such that e-mail messages directed to the hard imaging device 106 may be received and processed by the communications device 105 for delivery to the hard imaging device 106. In one exemplary embodiment, the hard imaging device 106 may be configured to use POP3 protocol for receiving e-mail messages and SMTP protocol for sending messages.

Hard imaging devices 106 are configured to form hard images. Hard images comprise images physically rendered upon output media 108, such as sheet paper, roll paper, envelopes, transparencies, labels, etc. Hard imaging devices 106 may be implemented as laser printers, inkjet printers, impact printers, copiers, facsimile devices, multiple function peripheral (MFP) devices, or any other configuration arranged to form hard images. Hard imaging devices 106 may have the same or different configurations in a given implementation of system 100. Additional details regarding an exemplary configuration of one of hard imaging devices 106 are described below with respect to FIG. 3.

Figure 2:
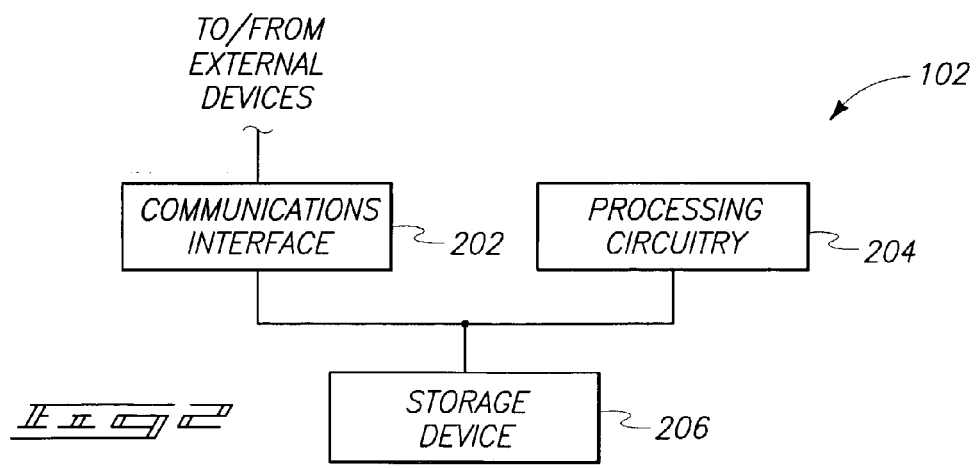
FIG. 2 is a functional block diagram of a user computer configured to access the hard imaging device according to one embodiment.

Referring to FIG. 2, further details of an exemplary user computer 102 are shown. As noted above, any one of the users at computers 102 may be provided with administrative capabilities or any one of the computers 102 may be configured as an administrative computer. The illustrated user computer 102 comprises a communications interface 202, processing circuitry 204, and a storage device 206.

Communications interface 202 is configured to communicate electronic data externally of the computer 102, for example, with respect to communications medium 104, communications device 105, and hard imaging device 106. In one embodiment, interface 202 is arranged to provide input/output communications with respect to external devices (e.g., hard imaging device 106, communications device 105). Interface 202 may comprise a parallel port, USB port, EIO slot, network interface card (e.g., JetDirect™), IEEE 1394 connector, and/or other appropriate configuration capable of communicating electronic data.

Processing circuitry 204 is configured to process data to invoke or control operations of hard imaging device 106. In one embodiment, processing circuitry 204 may comprise circuitry configured to execute provided programming. In one example, processing circuitry 204 may be configured to include executable applications (e.g., applet) received as an attachment with an e-mail message directed to the hard imaging device 106 for invoking an operation of the hard imaging device 106. Exemplary invocation of operations of the hard imaging device 106 include installing the executable applications received in the attachment in the hard imaging device 106, or printing the attachment using the hard imaging device 106. For example, processing circuitry 204 may be implemented as a microprocessor or other structure configured to execute executable applications of programming including, for example, software and/or firmware instructions. Other exemplary embodiments of processing circuitry 204 include hardware logic, PGA, FPGA, ASIC, and/or other structures. These examples of processing circuitry 204 are for illustration and other configurations are possible for implementing operations discussed herein.

Storage device 206 is configured to store electronic data, a database with file systems having one or more electronic files, programming such as executable instructions (e.g., software and/or firmware), and/or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

As illustrated in the depicted example, storage device 206 is configured to store file systems having one or more electronic files. In one embodiment, a storage device 206 may be configured to retrieve information from the storage device 308 (FIG. 3) of the hard imaging device 106 (FIG. 1) and display the retrieved information on a display device (not shown) of the user computer 102.

FIG. 3 shows an exemplary configuration of hard imaging device 106. Hard imaging device 106 comprises a communications interface 302, processing circuitry 304, native firmware circuitry 306, storage device 308, and an image engine 312. The depicted example of hard imaging device 106 comprises a printer for discussion purposes. Other implementations are possible as mentioned previously.

Communications interface 302 is configured to communicate electronic data externally of hard imaging device 106. In one embodiment, interface 302 is arranged to provide input/output communications with respect to external devices (e.g., computers 102, computer 103, and communications device 105) via communications medium 104. Interface 302 may be configured similarly to communications interface 202 of a user computer 102 in one embodiment.

Processing circuitry 304 is configured to process image data (e.g., rasterize data) and control operations of hard imaging device 106 (e.g., communications, imaging, e-mail file attachment installation/printing, etc.). Processing circuitry 304 may comprise circuitry configured to implement desired programming (e.g., a microprocessor or other structure configured to execute software and/or firmware instructions). Other exemplary embodiments of processing circuitry 304 include hardware logic, PGA, FPGA, ASIC, and/or other processing structures. These examples of processing circuitry are for illustration and other configurations are possible for processing image data and controlling operations of hard imaging device 106. In one embodiment, the processing circuitry 304 may be implemented using a server system 406, further details of which are described below at FIG. 4.

In one embodiment, the processing circuitry 304 is configured to retrieve electronic mail messages directed to the hard imaging device 106 from the communications device 105. An electronic mail message directed to the hard imaging device 106 might have file attachments sent from users of computers 102, 103 (FIG. 1), respectively, with instructions to invoke an operation (e.g., processing or printing of file attachments) of the hard imaging device 106. As described above, exemplary processing of the messages include installing executable applications comprised in the file attachment in the storage device 308 of the hard imaging device 106, or printing data of the file attachment using an image engine 312. In one embodiment, the executable applications could be loaded directly to RAM if a file system is not available, or if it is designated by a security policy of the printer. Other processing to invoke operations is possible.

In one arrangement, the processing circuitry 304 may be configured to track electronic mail messages having file attachments and received from remote users (e.g., registered users of computers 102 or unregistered users of computer 103). Exemplary messages request invocation of further processing of the file attachments.

The processing circuitry 304 is further configured to register users in an allowed list that may be stored in the storage device 308 of the hard imaging device 106. Users identified in the allowed list may be considered as registered users of the hard imaging device 106, while those users that are absent from the allowed list may be considered as unregistered users of the hard imaging device 106. As noted above, an administrator of the hard imaging device may be provided with privileges to update or modify the allowed list of users configured to use the hard imaging device 106.

In one embodiment, the processing circuitry may be configured to classify user requests sent as e-mail messages and having file attachments to invoke processing of the file attachments by the hard imaging device 106, and notify a user (e.g., registered) of the hard imaging device 106 of the classification and/or requests. For example, the user requests may be classified into messages requesting installation of executable applications, comprised in the file attachment, in the storage device 308 (or RAM) of the hard imaging device 106, messages requesting printing of the file attachments using the image engine 312 of the hard imaging device 106, and/or messages requesting other operations.

In another embodiment, the processing circuitry may be configured to install the executable applications, received as a file attachment, in the storage device 308 (or RAM) of the hard imaging device 106, and send a notification to a registered user (e.g., a user at computer 102) of the hard imaging device 106 of the installation.

In another embodiment, the processing circuitry 304 may be configured to determine if a user, requesting an invocation of processing of file attachments sent with an electronic mail message, is a registered user of the hard imaging device 106. If the processing circuitry 304 determines that the user is a registered user, then printing of the file attachment is performed using the image engine 312. If the processing circuitry 304 determines that the user (e.g., user at computer 103) is an unregistered user (e.g., not registered to use the hard imaging device 106), then the processing circuitry 304 is configured to store the file attachment in the storage device 308, and subsequently notify a registered user (e.g., user at computer 102) of the hard imaging device 106 of the request from the unregistered user. The processing circuitry 304 may await approval before further processing such a request. It will be appreciated that designations of registered and unregistered users at computers 102 or computer 103 is merely for purposes of illustration.

In another embodiment, if the processing circuitry 304 determines that a user, requesting an invocation of processing of file attachments sent with an electronic mail message, is a registered user of the hard imaging device 106, installation of executable applications (e.g., applet) comprised in the file attachment is performed, and a notification is sent to a registered user of the hard imaging device of the installation. A notification may also be sent to select registered users among a plurality of registered users of the hard imaging device 106. Alternatively, the notification may be sent either to select registered users and/or to an administrator of the hard imaging device 106. On the other hand, if the processing circuitry 304 determines that the user is not a registered user, then the processing circuitry 304 may be configured to store the file attachment in the storage device 308 and subsequently notify a registered user of the hard imaging device 106 of the request from the unregistered user to invoke processing of the file attachment by the hard imaging device 106. The processing circuitry 304 may await approval before further processing such a request.

The notification to a registered user (e.g., user at computer 102 (FIG. 1)) of the hard imaging device 106 may include a link to a web page of the hard imaging device 106. Exemplary information displayed on the web page may include information indicating operations invoked on hard imaging device 106 from file attachments (e.g., executable applications installed on the hard imaging device 106 by remote users or file attachment(s) printed by the hard imaging device 106). Additional information may be provided on the web page, such information including, for example, tracking of messages, classification of requests, rejected requests, accepted requests, etc. The web page may also display other information (e.g., toner level, device status, etc.) related to the hard imaging device 106. In one embodiment, displaying information on the web page of the hard imaging device 106 may be performed by invoking enhanced web services applications executable by the EWS 408 (FIG. 4) and EVM 410 (FIG. 4) of the processing circuitry 304, further details of which are described below at FIG. 4. The processing circuitry 304 may also be configured to enable an administrator of the hard imaging device 106 to view the information displayed on the web page and take appropriate actions (e.g., discard file attachments stored in the storage device 308 or allow requested processing of the file attachments to occur).

The native firmware circuitry 306 is created using an application program in order to implement interfaces between various components of the hard imaging device 106. In one example, the native firmware circuitry 306 may be written in C++ programming language and configured to manage installation, print processing, and storage of file attachments received from a remote user (e.g., users at computers 102 or computer 103) for processing by the hard imaging device 106. The native firmware circuitry 306 may also be configured to enable the remote user to retrieve and display information stored in the storage device 308 on a web page of the hard imaging device 106.

Storage device 308 is configured to store electronic data (e.g., for display on a website), programming such as executable instructions (e.g., software and/or firmware), and/or other digital information and may include articles of manufacture including processor-usable media described previously.

According to exemplary arrangements described herein, storage device 308 is configured to store a plurality of electronic files that may be stored in database 310. At least some of the files may be pertinent to hard imaging operations of the respective hard imaging device 106. During hard imaging operations of the hard imaging device 106, processing circuitry 304 may access electronic files of the file system. For example, exemplary files include fonts, electronic forms having modifiable fields, signature files, executable applications, programming supporting operation of the device 106 (e.g., software modules, firmware modules, etc.), and other electronic data usable by hard imaging device 106 to implement the formation of hard images and other functionality of device 106.

Image engine 312 is configured to form hard images upon output media 108 (FIG. 1). In one embodiment, image engine 312 comprises development and fusing assemblies configured to form the hard images using a marking agent, such as toner or ink. Image engine 312 may be configured to generate monochrome and/or color hard images. In exemplary printer embodiments of device 106, image engine 312 comprises a print engine.

FIG. 4 illustrates a functional block diagram of a processing circuitry 304 of the hard imaging device 106 in one exemplary embodiment. The processing circuitry 304 may execute programming of a server system 406 comprising an embedded web server 408, and an embedded virtual machine (EVM) 410. The EWS 408 and the EVM 410 are configured to convert messages from an external device (e.g., user computer 102 and communications device) into a format compatible with the native firmware circuitry 306. In one example, the embedded web server 408 is configured to provide an environment for executing web programs, results of which may be displayed by a web browser (e.g., Internet Explorer or Netscape Navigator). In one example, executable bytecode created by the embedded web server may include JAVA file system application program interfaces (JAVA APIs).

The embedded virtual machine 410 may be a real-time interpreter configured to create executable bytecode responsive to the executable bytecode received from the embedded web server 408. One possible embedded virtual machine program includes a Java Virtual Machine (JVM). The executable bytecode created by the embedded virtual machine 410 may be configured to interact with information stored in the storage device 308 via the native firmware circuitry 306.

The described installation, printing, and storing operations are provided to illustrate some aspects of system 100. Other operations by the user computers 102 and/or hard imaging devices 106 may be performed with respect to processing file attachments sent with electronic messages from a remote user according to other aspects.

Figure 5:
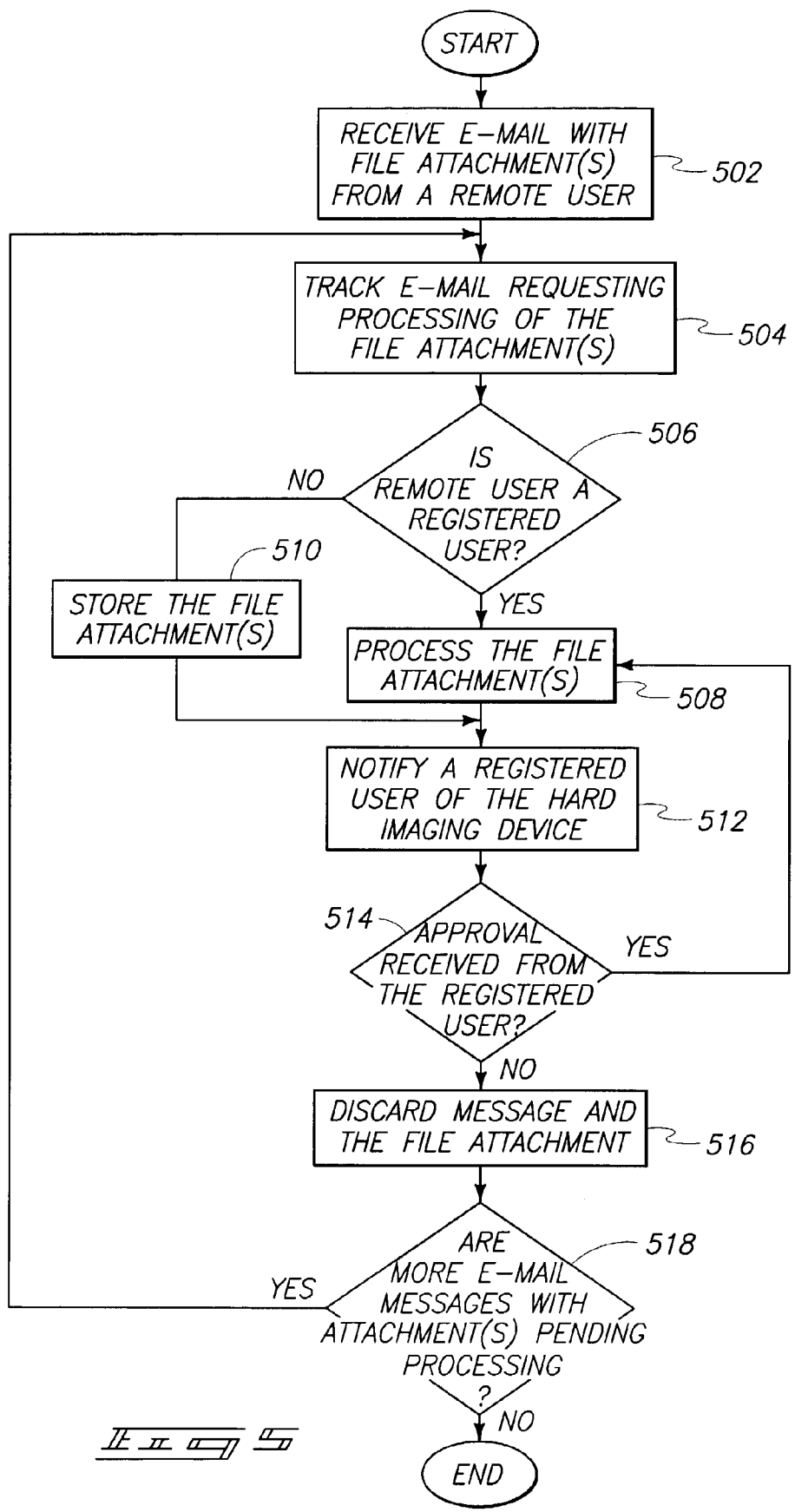
FIG. 5 is a flow chart of a methodology executable by a hard imaging device according to one embodiment.

Referring to FIG. 5, an exemplary methodology illustrating operations of processing circuitry 304 of the hard imaging device 106 to process a file received as an e-mail attachment is shown. Other methods are possible including more, less or alternative steps.

At a step 502, e-mail messages are received from the communications device 105, the e-mail messages sent by a registered user at computer 102 or an unregistered user at computer 103 to the communications device 105 and directed to the hard imaging device 106.

At a step 504, the received e-mail messages having file attachments and instructions to invoke processing of the file attachments are tracked.

At a step 506, an inquiry is made to determine whether or not a sender of the e-mail messages to the hard imaging device 106 is a registered or an unregistered user of the hard imaging device 106. If the processing circuitry 304 determines that the sender is a registered user of the hard imaging device 106, step 508 is performed. If the processing circuitry determines that the sender is not a registered user of the hard imaging device 106, step 510 is performed.

At the step 508, the file attachment is processed by the processing circuitry 304. Exemplary processing operations include installing executable applications comprised in the file attachment in the storage device 308 of the hard imaging device 106, or printing the file attachment using the image engine 312 of the hard imaging device.

At the step 510, upon determining that the sender of the file attachment is not a registered user of the hard imaging device 106, the processing circuitry 304 stores the file attachment in the storage device 308 of the hard imaging device. For example, users identified in an allowed list stored in the storage device 308 of the hard imaging device 106 may be considered as registered users of the hard imaging device 106, while those users that are absent from the allowed list may be considered as unregistered users of the hard imaging device 106 (FIG. 1). As noted above, an administrator of the hard imaging device may be provided with privileges to update or modify the allowed list of users configured to use the hard imaging device 106.

At a step 512, the processing circuitry 304 notifies a registered user of the hard imaging device regarding the processing of the file attachment performed at step 508 or storage of the file attachment performed at step 510. The notification to a registered user (e.g., user at computer 102 (FIG. 1)) of the hard imaging device 106 (FIG. 1) may include a link to a web page of the hard imaging device. Exemplary information displayed on the web page may include information indicating executable applications installed on the hard imaging device 106 (FIG. 1) by remote users (e.g., users at computer 102 shown in FIG. 1) or file attachment(s) printed by the hard imaging device 106 (FIG. 1). The web page may also display other information (e.g., toner level, device status, etc.) related to the hard imaging device 106 (FIG. 1). In one embodiment, displaying information on the web page of the hard imaging device 106 (FIG. 1) may be performed by invoking enhanced web services applications executable by the EWS 408 (FIG. 4) and EVM server 410 (FIG. 4) of the processing circuitry.

At a step 514, an inquiry is made to determine if an approval is received by the processing circuitry 304 from the registered user or an administrator of the hard imaging device 106 (FIG. 1) to continue processing of the file attachment received from an unregistered user of the hard imaging device 106. If an approval is received processing circuitry 304, the file attachment is processed as described at step 508. If an approval is not received by the processing circuitry 304, step 516 is performed.

At a step 516, the file attachment stored in the storage device 308 (FIG. 3) of the hard imaging device 106 (FIG. 3) and the message from an unregistered user of the hard imaging device are discarded.

At a step 518, an inquiry is made to determine if any more e-mail messages with file attachments are pending for processing by the processing circuitry 304. If there are more e-mail messages with file attachments requiring further processing, the process proceeds to perform step 504.

Exemplary advantages of some embodiments include the following: remote applications may use an industry standard protocol, such as, for example HTTP protocol, to access printer file systems, thus eliminating a need for the remote applications to use vendor-specific and device-specific file system commands (e.g., such as those provided by Printer Job Language (PJL)). The present invention provides a solution to the problem of not being able to easily reference a file system content of a hard imaging device from applications executing on remote computer systems.

The protection sought is not to be limited to the disclosed embodiments, which are given by way of example only, but instead is to be limited only by the scope of the appended claims.

What is claimed is:

1. A hard imaging device comprising:
a communications interface configured to communicate with an external device which is located external of the hard imaging device;
an image engine configured to form hard images upon media;
processing circuitry configured to control the image engine to form the hard images;
wherein the processing circuitry is configured to access and process an electronic mail communication received via the communications interface within the hard imaging device and to execute an executable application included in the electronic mail communication; and
wherein the processing circuitry is configured to initially preclude printing of data of the electronic mail communication and store the data in a storage device of the hard imaging device if a sender of the electronic mail communication is not identified as a registered user of the hard imaging device.

2. The device of claim 1, wherein the processing circuitry is configured to notify a user of the hard imaging device of the received electronic mail communication.

3. The device of claim 2, wherein the notification comprises a link to a web page of the hard imaging device comprising information regarding the electronic mail communication.

4. The device of claim 1, wherein the electronic mail communication comprises a request to print data of the electronic mail communication, and the processing circuitry is configured to print the data only if a sender of the electronic mail communication is identified as a registered user of the hard imaging device.

5. The device of claim 1, wherein the processing circuitry is further configured to notify a registered user of the hard imaging device of a print request from the sender if the sender is not identified as a registered user of the hard imaging device.

6. The device of claim 1 wherein the hard imaging device is a printer comprising a single housing configured to house the communications interface, the image engine, and the processing circuitry.

7. The device of claim 1 wherein the communications interface, the image engine, and the processing circuitry comprise components of the hard imaging device which is a single entity comprising a printer.

8. The device of claim 1 wherein the electronic mail communication comprises a print job and the processing circuitry is configured to control the image engine to print the print job.

9. The device of claim 8 wherein the processing circuitry is configured to control the image engine to print the print job only if a sender of the electronic mail communication is a registered user of the hard imaging device.

10. The device of claim 1 wherein the executable application comprises executable code and the processing circuitry is configured to control the installation of the executable code within the hard imaging device.

11. The device of claim 10 wherein the processing circuitry is configured to control the installation of the executable code only if a sender of the electronic mail communication is a registered user of the hard imaging device.

12. A hard imaging device comprising:
a communications interface configured to communicate with an external device which is located external of the hard imaging device;
an image engine configured to form hard images upon media;
processing circuitry configured to control the image engine to form the hard images;
wherein the processing circuitry is configured to access and process an electronic mail communication received via the communications interface within the hard imaging device and to execute an executable application included in the electronic mail communication; and
wherein the processing circuitry is configured to initially preclude installation of the executable application of the electronic mail communication, store the executable application in a storage device of the hard imaging device, and notify a registered user if a sender of the electronic mail communication is not identified as a registered user of the hard imaging device.

13. The device of claim 12, wherein the processing circuitry is configured to perform automatic installation without user input of the executable application of the electronic mail communication within the hard imaging device if a sender of the electronic mail communication is a registered user of the hard imaging device.

14. The device of claim 13, wherein the processing circuitry is configured to track installation of the executable application and notify a registered user of the hard imaging device of the installation.

15. A hard imaging device comprising:
a communications interface configured to communicate with an external device located external of the hard imaging device;
an image engine configured to form hard images upon media;
processing circuitry configured to control the image engine to form the hard images;
wherein the processing circuitry is configured to access and process an electronic mail communication received via the communications interface within the hard imaging device, and to notify a registered user of the hard imaging device of the processing; and
wherein the processing circuitry is configured to store electronic information of the electronic mail communication in a storage device of the hard imaging device and to notify a registered user of the hard imaging device of the electronic mail message if a user of the remote computer is identified as an unregistered user of the hard imaging device.

16. The device of claim 15, wherein the processing circuitry is configured to ascertain whether a sender of the electronic mail communication is a registered user of the hard imaging device and to print electronic information of the electronic mail communication only if the sender is identified as a registered user of the hard imaging device.

17. The device of claim 15, wherein processing the electronic mail communication comprises performing installation of electronic information of the electronic mail communication in the hard imaging device only if a sender of the electronic mail communication is identified as a registered user of the hard imaging device.

18. A hard imaging device electronic mail processing method comprising:
receiving a plurality of electronic mail messages for processing by a hard imaging device which is configured to form hard copy images upon media, wherein the receiving comprises receiving the electronic mail messages within the hard imaging device from externally of the hard imaging device;
processing the electronic mail messages by the hard imaging device;
wherein the processing comprises installing executable code contained within at least one of the electronic mail messages within the hard imaging device; and
printing electronic information of at least one of the electronic mail messages only if a sender of the at least one of the electronic mail messages is identified as a registered user of the hard imaging device;
storing electronic information of one of the electronic mail messages in a storage device of the hard imaging device if a sender of the one of the electronic mail messages is not identified as a registered user of the hard imaging device;
pausing printing of the electronic information;
notifying a registered user of the hard imaging device of the pausing; and
printing the electronic information upon receiving permission from an administrator of the hard imaging device.

19. The method of claim 18 wherein the hard imaging device comprises a printer, and wherein the receiving and the processing comprise receiving and processing the electronic mail messages by the printer.

20. The method of claim 18 wherein the processing comprises printing a plurality of print jobs within the electronic mail messages to form the hard copy images upon media.

21. The method of claim 20 wherein the printing comprises printing only the print jobs which were included within the electronic mail messages which were sent by a user authorized to use the hard imaging device.

22. The method of claim 18 wherein the installing comprises installing only the executable code which was included within the at least one of the electronic mail messages which was sent by a user authorized to use the hard imaging device.

23. A hard imaging device comprising:
a communications interface configured to communicate with a communications medium and a communications device, the communications device and the communications medium are communicatively coupled with one another and located external of the hard imaging device;
an image engine configured to form hard images using media;
processing circuitry configured to control the image engine to form hard images and to communicate with the communication device and an external computer device;
wherein the processing circuitry is configured to track electronic mail communication comprising electronic information received within the hard imaging device and invoke an operation of the hard imaging device; and
wherein the processing circuitry is configured to pause printing of data of the electronic mail communication and store the data in a storage device of the hard imaging device if a user of the external computer device is not identified as a registered user of the hard imaging device.

24. The device of claim 23 wherein the processing circuitry is further configured to notify a registered user of the hard imaging device of a print request from the user if the user is not identified as a registered user of the hard imaging device.

25. A hard imaging device comprising:
a communications interface configured to communicate with a communications medium and a communications device, the communications device and the communications medium are communicatively coupled with one another and located external of the hard imaging device;
an image engine configured to form hard images using media;
processing circuitry configured to control the image engine to form hard images and to communicate with the communication device and an external computer device;
wherein the processing circuitry is configured to track electronic mail communication comprising electronic information received within the hard imaging device and invoke an operation of the hard imaging device; and
wherein the processing circuitry is configured to pause installation of the electronic information, store the electronic information in a storage device of the hard imaging device, and notify a registered user if the user of the external computer device is not identified as a registered user of the hard imaging device.

26. A hard imaging device comprising:
a communications interface configured to communicate with a communications medium and a communications device, the communications device and the communications medium are communicatively coupled with one another and located external of the hard imaging device;
an image engine configured to form hard images using media;
processing circuitry configured to control the image engine to form a hard image and to communicate with the communications device and a remote computer;
wherein the processing circuitry is configured to process electronic information sent with an electronic mail message from the remote computer, and notify select registered users of the hard imaging device of the processing; and
wherein the processing circuitry is configured to store the electronic information in a storage device of the hard imaging device and notify a registered user of the hard imaging device of the electronic message if a user of the remote computer is identified as an unregistered user of the hard imaging device.

27. A hard imaging device electronic mail processing method comprising:
providing a hard imaging device configured to form hard copy images using media;
providing a communications device configured to communicate electronic mail messages and electronic information sent with the mail messages from a remote user to the hard imaging device for processing by the hard imaging device;
receiving the mail messages and the electronic information for processing by the hard imaging device;
tracking an electronic mail message from the remote user requesting invocation of processing the electronic information sent with the mail message by the hard imaging device;
storing the electronic information in a storage device of the hard imaging device if the remote user is not identified as a registered user of the hard imaging device;
pausing printing of the electronic information;
notifying a registered user of the hard imaging device of the pausing; and
printing the electronic information upon receiving permission from an administrator of the hard imaging device.

28. An article of manufacture comprising:
processor-usable media comprising programming configured to cause a processing circuitry of a hard imaging device to perform processing comprising:
receiving an electronic message with a file attachment from a remote user to invoke processing of the attachment by the hard imaging device;
classifying the electronic message responsive to the receiving to perform the invocation;
storing the electronic mail message in a storage device of the hard imaging device;
notifying information of the electronic message to a user of the hard imaging device;
automatically installing the file attachment upon receiving an installation request from the remote user;
installing the file attachment if the remote user is identified as a registered user of the hard imaging device; and
storing the file attachment in a storage device of the hard imaging device if the remote user is not identified as a registered user of the hard imaging device.

* * * * *